April 16, 1963  A. P. RASMUSSEN ETAL  3,085,354
MULTI-GIMBAL FLIGHT SIMULATOR
Filed Jan. 31, 1957  4 Sheets-Sheet 1

WITNESSES

INVENTORS
Arne P. Rasmussen, Rudolf J. Bertl
and Albert I. Geyser
BY
ATTORNEY

April 16, 1963   A. P. RASMUSSEN ETAL   3,085,354
MULTI-GIMBAL FLIGHT SIMULATOR
Filed Jan. 31, 1957   4 Sheets-Sheet 4
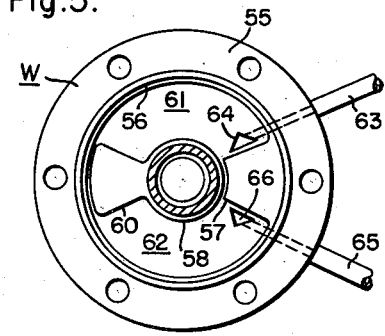
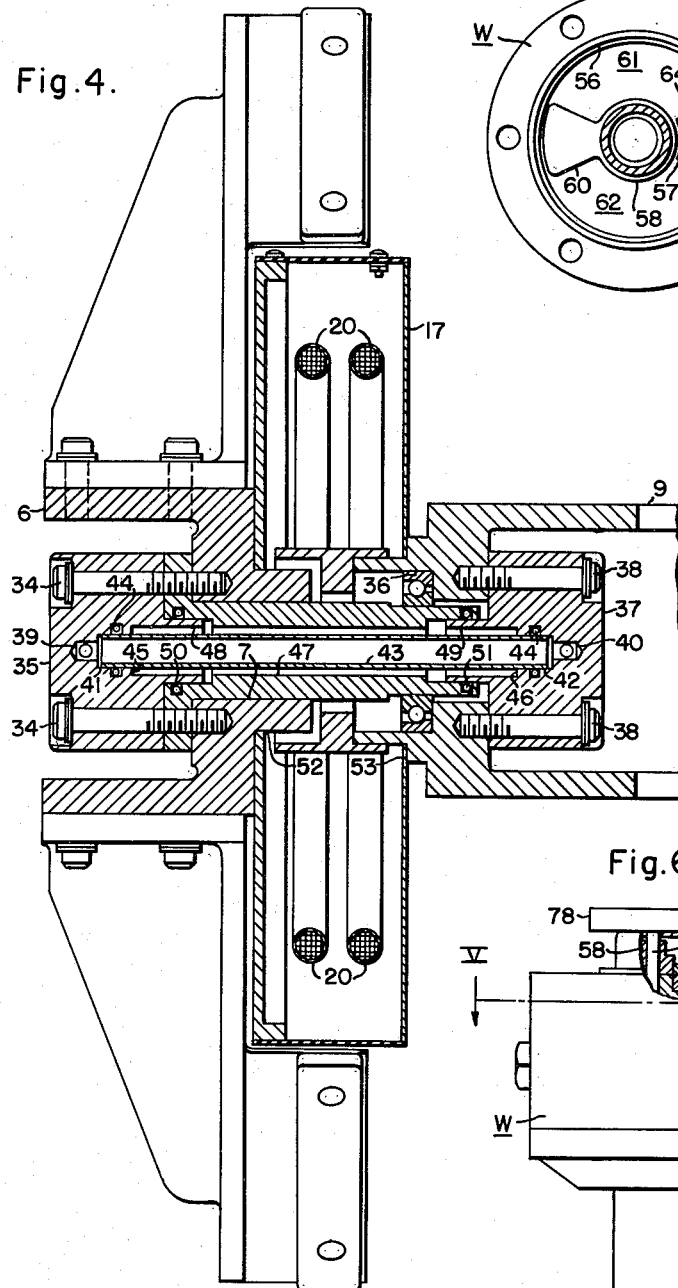
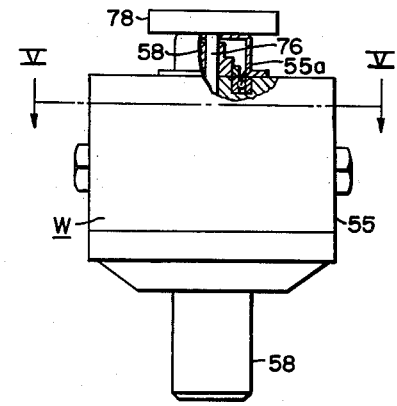

United States Patent Office 3,085,354
Patented Apr. 16, 1963

3,085,354
MULTI-GIMBAL FLIGHT SIMULATOR
Arne P. Rasmussen, Millersville, and Rudolf J. Bertl, Arnold, Md., and Albert I. Geyser, Pittsburgh, Pa., assignors to Westinghouse Electric Corporation, East Pittsburgh, Pa., a corporation of Pennsylvania
Filed Jan. 31, 1957, Ser. No. 637,584
13 Claims. (Cl. 35—12)

The present invention is directed to a multi-gimbal attitude simulator and more particularly to a three gimbal attitude simulator capable of providing aircraft flight equipment with rapid simulation of an aircraft attitude.

The purpose of a flight simulator is to impose angular motions pitch and yaw on aircraft stabilizing elements. Stabilizing elements such as gyroscopes are an important part of aircraft autopilots, and in order to predict how a given aircraft autopilot will perform in flight, it is necessary to approximate as closely as possible actual flight conditions in the laboratory. For example, one setup for a simulator may be one in which the gyros for an airplane autopilot are mounted on a platform of the flight simulator. Commands necessary for the control of the aircraft would then be initiated on a laboratory mockup of the airplane in order to execute the maneuvers. The commands, resulting in control deflections of the airplane mockup controls, would then be fed into a computer which would compute the motion of the airplane. This motion would then be fed into the flight simulator causing the simulator to respond by positioning itself to the commands. The autopilot gyros mounted on the platform of the flight simulator would then respond to the flight simulator imposed motion by introducing signals to the mockup airplane autopilot. In this way, the present flight simulator allows a more realistic picture of the actual airplane performance to be expected. This performance is indicated even before the aircraft autopilot parts are installed in the aircraft and tested under actual flight conditions.

Some flight simulators have previously existed, however, which have been found in many cases to be inadequate. The simulators were generally made up of two gimbals which were generally capable of providing all normal conventional aircraft motions of well known aircraft. However, with present-day high speed aircraft a new attitude is found to be more prevalent, this being one of vertical ascent. Under these conditions, it can be seen that a two gimbal simulator would fail to provide yaw motion for an aircraft traveling in vertical direction.

Some previous flight simulators have also been provided with motor gear trains for performing rotating motions of the gimbals. The use of a gear train introduces two difficulties. The first difficulty is that wear due to numerous operations would introduce some backlash motion causing unwanted wear signals in the equipment being tested. The second difficulty is the introduction of inertia and friction causing the flight simulator gimbals to be slow in response to a command signal.

It is, therefore, an object of this invention to provide a multi-gimbal flight simulator capable of providing all desired motions in every possible attitude of an aircraft.

It is another object of this invention to provide a multi-gimbal flight simulator capable of rapid response to command signals without over-control.

It is still another object of this invention to provide a multi-gimbal flight simulator capable of positive response without the introduction of lost motion.

It is another object of this invention to provide a multi-gimbal simulator capable of accurate operation while at the same time being reduced in complexity.

Other objects, purposes and characteristic features will be obvious from the accompanying drawings and specification.

In practicing this invention, there is provided a flight simulator having three gimbals of concentric configuration. A first gimbal or outer gimbal is supported on pivots secured to a base member while the remaining concentric gimbals are each supported on its associated outer gimbal. The smallest or innermost gimbal is provided with an equipment supporting platform which is pivotally supported on the inner gimbal. The gimbals are relatively rotated by hydraulic vane type motors provided with electrically controlled hydraulic valves for selecting the direction and amount of rotation of each gimbal. Each hydraulic vane actuator and control valve is provided with a closed loop electrical circuit for the control of the control valve in which fed-back signals determined by the position of the hydraulic vane motor are used to stabilize the hydraulic control valve and motor.

FIG. 4 is a partly sectioned view taken along the line IV—IV of FIG. 1 showing the hydraulic fluid passages which are typical of the pivots between the gimbals;

FIG. 5 is a cross-sectional view taken along line V—V of FIG. 6 showing the hydraulic vane motor construction;

FIG. 6 is a view of the hydraulic vane motor removed from the gimbal of the flight simulator.

Similar parts in each of the several views will be designated by similar reference characters.

Figure 1:
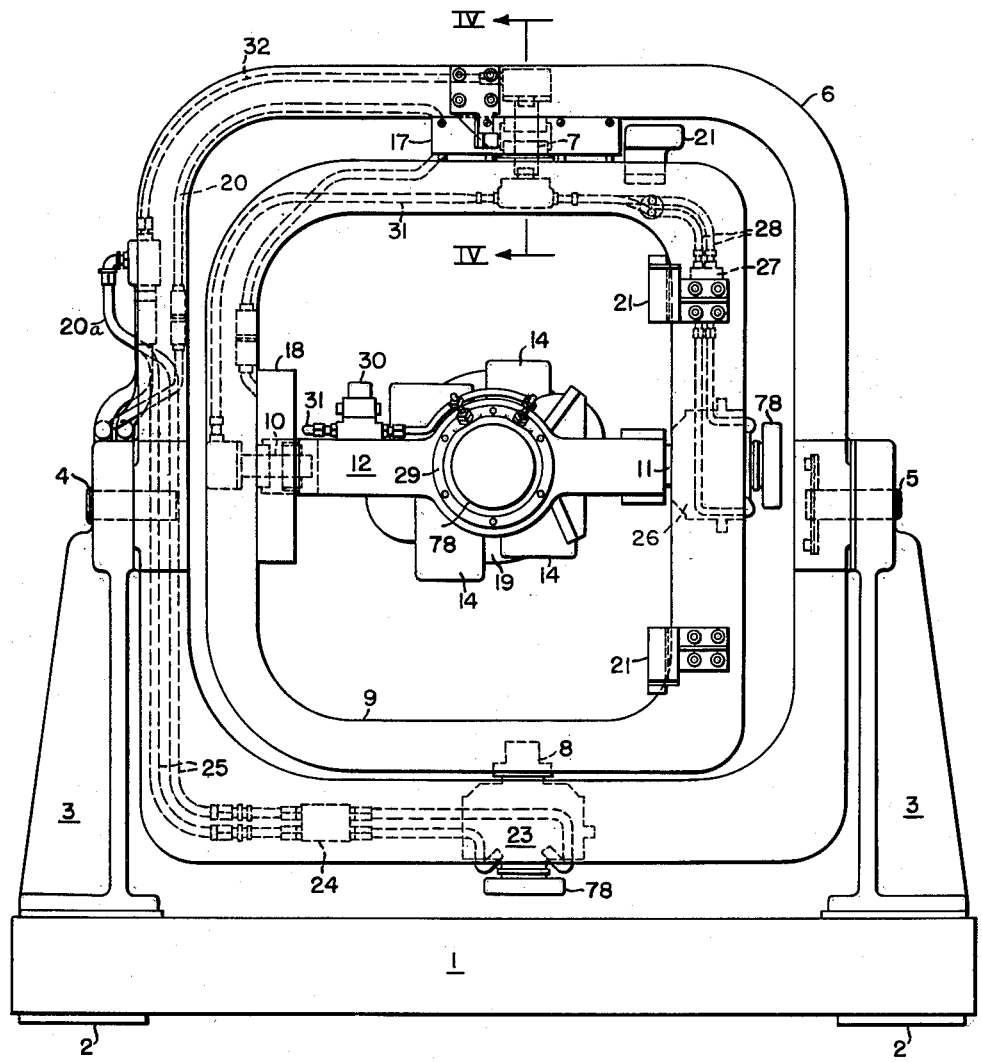
FIGURE 1 is a front elevationel view of the three-gimbal simulator of this invention.

FIG. 1 shows an elevational view of the three-gimbal simulator having a base 1 provided with suitable feet 2 and a pair of upstanding arms 3. The upstanding arms 3 are positioned in spaced-apart relationship and provided with pivots 4 and 5 on the upper ends thereof. The pivots 4 and 5 are then secured to the first gimbal 6 which is generally rectangular in configuration. As viewed in FIG. 1, the gimbal 6 is provided with a pair of pivot supports 7 and 8 for pivotally securing a second gimbal 9 to the gimbal 6. The gimbal 9, similar to the gimbal 6, is also of a modified rectangular configuration. The pivots 7 and 8 are positioned in a plane 90° to the plane of axis of the pivots 4 and 5. As viewed in FIG. 1, the gimbal 6 can rotate about a horizontal axis while the gimbal 9 can rotate about an axis in a vertical plane.

Figure 3:
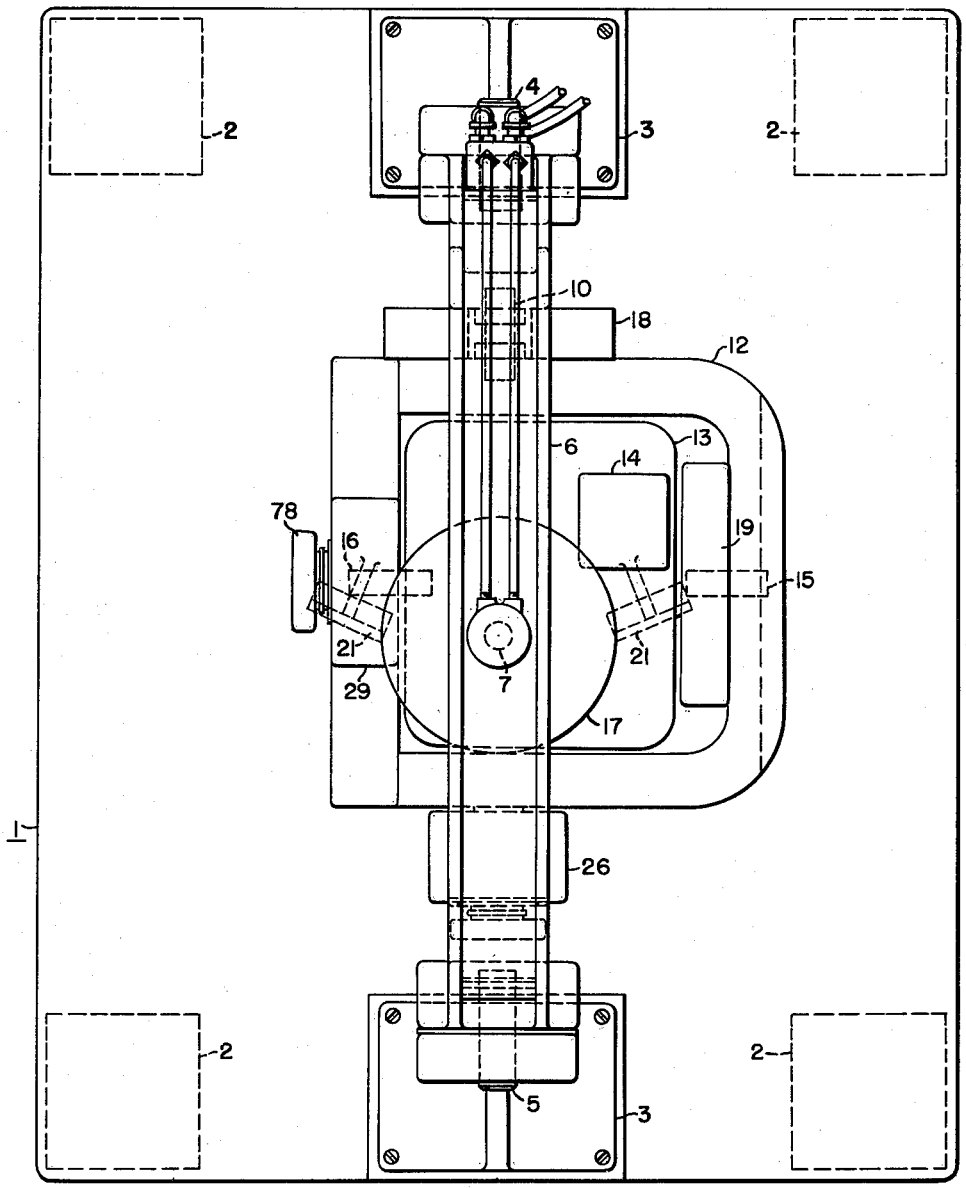
FIG. 3 is a top plan view of the three-gimbal simulator.

The gimbal 9 is provided with a second pair of pivots 10 and 11 positioned 90° from the pivots 7 and 8, thus placing them in a plane parallel to the pivots 4 and 5. The pivots 10 and 11 then provide support for a third gimbal 12 also of generally rectangular configuration as shown in FIG. 3. Positioned within the center area described by the gimbal 12 is a platform 13 for supporting equipment 14 to be tested. The platform 13 is pivoted to the gimbal 12 by the pivots 15 and 16 which are positioned 90° from the pivots 10 and 11 supporting the gimbal 12.

Figure 2:
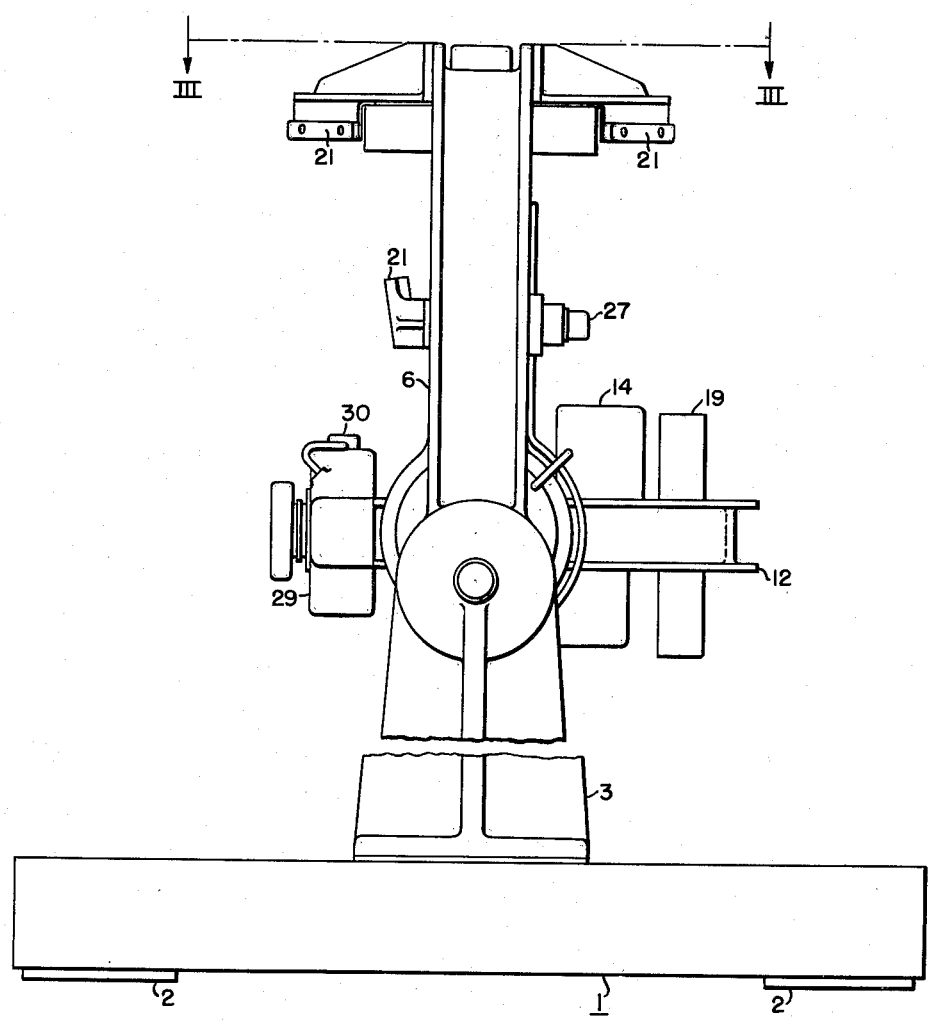
FIG. 2 is a side elevational view of the three-gimbal simulator.

The outer gimbal 6 is normally stationary on the pivots 4 and 5 and positioned vertically as shown in FIG. 2. Under these conditions all attitudes of an aircraft can be simulated except an attitude involving vertical direction of travel. When vertical travel simulation is necessary, the gimbal 6 is rotated 90° to a horizontal position so that a yaw motion is possible during vertical ascent.

Associated with the pivot 8 supporting the gimbal 9 on the gimbal 6 is a hydraulic vane actuator or motor used to rotate the gimbal 9 with respect to the gimbal 6 in response to command signals as will be explained hereinafter. The pivot 7, also providing support for the gimbal 9 on the gimbal 6, is a pivot capable of providing fluid passage from the gimbal 6 to the gimbal 9 for providing motive power for the hydraulic vane actuators to be explained hereinafter.

Pivot 11, supporting the gimbal 12 on the gimbal 9, is likewise provided with a hydraulic vane actuator for providing relative rotation of the gimbal 12 with respect to the gimbal 9 in response to the command signals. The pivot 10 is similar to the pivot 7 in that this pivot provides for fluid passage between the two relatively moving gimbals.

The pivot 16 supporting the platform 13 on the gimbal 12 is also provided with a hydraulic vane actuator for imparting rotation to the platform 13 with respect to the gimbal 12.

The pivots 7 and 10, in addition to providing a fluid passage, are also provided with housings 17 and 18 respectively for supporting a pair of looped electrical cables electrically interconnecting parts supported on their respective gimbals while allowing relative rotation of the respective gimbals. Likewise, the pivot 15 is provided with a housing 19 capable of supporting a pair of looped electrical cables for the passage of incoming and outgoing signals to and from the equipment to be tested.

The gimbal 6 is provided with electrical and hydraulic connections 20 and 20a respectively interconnecting the gimbal 6 with the base arm 3 adjacent the pivot 4. These connections are provided with sufficient slack to allow rotation of the gimbal 6 from its vertical to its horizontal position. The gimbals 9 and 12 and the platform 13 are provided with stop members 21 capable of limiting angular movement of each of the gimbals or the platform to the limits of the electrical conductors housed within the pivots 7, 10 and 15. The gimbal 6 is provided with a hydraulic vane actuator 23 controlled by a hydraulic valve 24 supplied with fluid through a pair of supply pipes 25. The gimbal 9 is provided with hydraulic vane actuator 26 controlled by hydraulic valve 27 supplied by a pair of fluid supply pipes 28. The platform 13 is provided with a hydraulic actuator 29 controlled by a hydraulic control valve 30 supplied with fluid by a pair of fluid pipes 31. Each of the pairs of fluid pipes 25, 28 and 31 are supplied with fluid under pressure through a pair of fluid pipes 32 and the two flexible pipes 20a.

The structure disclosed by FIG. 4 taken along the lines IV—IV of FIG. 1 is a partially sectioned view of the pivot 7 showing fluid passages and electrical delivery from the gimbal 6 to the gimbal 9. The pivot 7 is secured to the gimbal 6 by the bolts 34 and securing block 35 at pivot 7 and its other end is then provided with a ball bearing 36 pivotally supporting the gimbal 9. Gimbal 9 is then provided with an end fluid pipe connecting end cap 37 secured to the gimbal 9 by suitable bolts 38. The end caps 35 and 37 are provided with central openings 39 and 40 respectively with the central opening 39 being connected to one of a pair of supply pipes 32 and the central opening 40 being connected to one of each pair of the fluid flow pipes 28 and 31. The central openings 39 and 40 are then provided with areas of enlarged diameter 41 and 42 respectively interconnected by a hollow tube or pipe 43. The pipe 43 is provided with fluid seals 44 in the respective end caps 35 and 37 to prevent fluid flow past the end caps into the ball bearing area. The end caps 35 and 37 are additionally provided with a second enlarged diameter area extending from the center openings 39 and 40. The second enlarged diameters for the end caps 35 and 37 are designated as 45 and 46 respectively. The enlarged diameter areas 45 and 46 are then connected to the other of the pair of fluid flow pipes 32 and 28 or 31 respectively through fluid taps not shown, thus providing a second fluid passage between these pipes. The pivot member 7 is provided with an enlarged central opening 47 interconnecting the enlarged diameters 45 and 46 of the end caps 35 and 37. The end caps 35 and 37 are also provided with inwardly extending fluid shield sleeve portions 48 and 49 respectively, capable of cooperating with pivot seals 50 and 51 respectively. The seals 50 and 51 prevent fluid leakage from the second passage described by the chambers 45, 46 and 47, out past the ball bearing 36. It can be seen with this structure that a pair of fluid passages uninterrupted by the rotation of the gimbals 6 and 9 is provided by this pivot structure.

Secured to the portion of the gimbal 9 housing the ball bearing 36 is the electrical cable housing 17 provided to prevent damage to the electrical cables 20 utilized to transfer electrical signals from the gimbal 6 to the gimbal 9 and vice versa. The housing 17 is secured to the gimbal 6 by a friction press fit at the point 52 and is free to rotate relative to the gimbal 9 at the contact surface 53.

It is clear, therefore, that the pivot connection of pivot 7 as well as the pivots 10 and 15 provide fluid and electrical connections between the respective relatively moving members.

The structure of the hydraulic vane actuator, disclosed as providing relative rotation between the interconnecting gimbals, is diagrammatically shown in the drawing view of FIGS. 5 and 6. This vane actuator has been designated W and has housing reference character 55 since it is generic and can be any of the hydraulic vane actuators 23, 26 and 29 of the multi-gimbal simulator. The actuator housing 55 is provided with a central opening 56 having an inwardly extending tooth 57 terminating in close relationship to a central hub 58. The central hub 58 is capable of rotational motion within the housing 55 in bearings 55a capable of preventing end play and is provided with an actuator vane 60 of a length equal to the inner diameter of the central opening 56 of the hydraulic vane actuator 55. The vane 60 in cooperation with the tooth 57 of the housing 55 cooperate to form two fluid chambers designated 61 and 62. The chamber 61 is shown with a fluid connection to the hydraulic fluid pipe 63 capable of supplying or receiving fluid to or from respectively the chamber 61. The pipe 63 is provided with a triangular entrance port 64 in the chamber 61 to serve the purpose of a deceleration stop for the vane 60 and its attached mass. Similarly, the chamber 62 is provided with a fluid supply pipe 65 capable of supplying or releasing fluid to or from the chamber 62. The chamber 62 is likewise provided with a triangularly shaped entrance port 66 to act as a vane 60 deceleration stop. It can be seen, therefore, that if fluid is supplied through a pipe 63 to the chamber 61 while the chamber 62 is provided with a release of fluid through the pipe 65, that a counterclockwise rotation of the vane member 60 and the hub 58 will take place. However, as fluid is supplied through the pipe 65 and exhausted from the pipe 63, a clockwise rotation of the vane member 60 and the hub 58 takes place.

Figure 7:
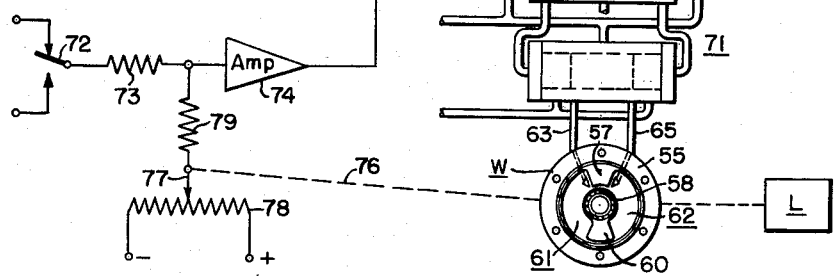
FIG. 7 is a typical control circuit for a hydraulic vane motor showing the feedback circuit.

In FIG. 7 there is shown a typical hydraulic vane actuator control circuit. The hydraulic vane actuator W is controlled for reversible operation by a two-stage hydraulic control valve 71 that is responsive to electrical input impulses. A valve of this description is shown and described in detail in United States Patent No. 2,889,815 issued June 9, 1959 to W. B. Lloyd, entitled Pressure Feedback Valve and assigned to the common assignee. It should be sufficient to state at this time that control impulses of one polarity received by the torque motor winding 70, of the valve 71, causes fluid flow to the hydraulic actuator W for one direction of actuator rotation; while control impulses of the opposite polarity received by the winding 70 causes the opposite rotation of the actuator W.

The actuator W control circuit comprises an input polarity reversing switch 72 connected to a limiting resistor 73 in the input to an amplifier 74. The amplifier 74 output is then connected to the torque motor winding 70 of the previously mentioned valve 71. The valve 71 output is then connected to the hydraulic actuator W for operation similar to that described above. Connected to the shaft of the hydraulic actuator W is the variable arm 77 of a potentiometer 78. The potentiometer 78 is connected across a source of power (not shown). The variable tap is then connected to the input of the amplifier 74 through a limiting resistor 79.

Operation of the control circuit shown in FIG. 7 is a typical operation common to all of the vane motors or actuators. An electrical impulse supplied from the switch 72 through the limiting resistor 73 to the amplifier 74 is applied through the conductor 75 to the coil 70 of the control valve 71 to cause the actuator 55 to rotate in one direction or the other. This rotating action is then applied to one of the gimbals 9 or 12 or the platform 13 and through the direct mechanical connection 76 to the variable tap 77 of potentiometer 78. The gimbal or platform load is represented by the load L. Positioning of the tap 77 along with the potentiometer 78 causes an electrical impulse to be directed through the limiting resistor 79 to the amplifier 74 with this impulse being in a direction to cause stabilization or neutration of the incoming signal from the switch 72. This system then forms a closed system capable of stable operation.

Operation of the three-gimbal flight simulator will now be described under two conditions. The first condition is one in which an attitude of an aircraft is assumed to be of conventional type excluding vertical flight. Under these conditions the vane motor 23 provides rotation of the gimbal 9 for yaw control, the vane motor 26 provides rotation of the gimbal 12 for pitch control and the vane motor 29 provides rotation of the platform 13 to simulate roll control. Under these conditions the gimbal 6 is held in the stationary position shown in FIG. 1. The control of the vane motors 23, 26 and 29 would be through three control circuits similar to the one shown in FIG. 7 with control impulses coming either from manual switch or a control computer. The vane motor 23 is controlled through a fluid control valve 24 which is similar to the valve 71 of FIG. 7. Likewise, the vane motor 26 is controlled by a fluid control valve 27 and the vane motor 29 is controlled by a fluid control valve 30, each of which is similar to the control valve 71 of FIG. 7.

The remaining flight condition to be simulated is one in which a vertical flight path is necessary. Under these conditions, with the gimbal 6 in the position shown in FIG. 1 and the gimbal 12 rotated to a position 90° from that shown in FIG. 1, it can be seen that a locked condition would exist in which no yaw motion could be assumed. When vertical flight is anticipated, the gimbal 6 is rotated 90° to the position shown in FIG. 1 and under these conditions the vane motor 23 provides yaw motion, the vane motor 26 provides pitch motion and the vane motor 29 provides roll motion.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A three-gimbal aircraft attitude simulator comprising a first gimbal supported for rotation on independently mounted pivots, a second gimbal supported for rotation on first-gimbal-supported pivots aligned perpendicularly to said independently mounted pivots, a third gimbal supported for rotation on second-gimbal-supported pivots aligned perpendicularly to said first-gimbal-supported pivots, a test equipment support platform supported for rotation on third-gimbal-supported pivots aligned perpendicularly to said second-gimbal-supported pivots, and drive means associated with each of said pivots for causing relative displacement of each gimbal with respect to each of the others and said platform with respect to each of said gimbals.

2. A three-gimbal aircraft attitude simulator comprising a first gimbal supported for rotation on independently mounted horizontally-aligned pivots, a second gimbal supported for rotation on first-gimbal-supported pivots aligned perpendicularly to said horizontally-aligned pivots, a third gimbal supported for rotation on second-gimbal-supported pivots aligned perpendicularly to said first-gimbal-supported pivots, a test equipment support platform supported for rotation on third-gimbal-supported pivots aligned perpendicularly of said second-gimbal-supported pivots, drive means associated with each of said pivots for causing relative displacement of each gimbal with respect to each of the others and said platform with respect to each of said gimbals, and control means for selectively controlling said drive means for positioning said gimbals.

3. A multi-gimbal aircraft attitude simulator comprising a first gimbal supported for rotation about an independent axis, a second gimbal supported on a first pivot on said first gimbal for rotation about a second axis substantially ninety degrees to said independent axis, a third gimbal supported on a second pivot on said second gimbal for rotation about a third axis substantially ninety degrees to said second axis, a platform supported on a third pivot on said third gimbal for rotation about a fourth axis substantially ninety degrees to said third axis, said first, second and third pivots being provided with respective hydraulic drive means for effecting relative rotation between the aforesaid gimbals and platform, and control means for selectively actuating each of said hydraulic drive means.

4. A multi-gimbal aircraft attitude simulator comprising a first gimbal supported for rotation about an independently-determined axis, a second gimbal supported on a first pivot on said first gimbal for rotation about a second axis substantially ninety degrees to said independently-determined axis, a third gimbal supported on a second pivot on said second gimbal for rotation about a third axis substantially ninety degrees to said second axis, a platform supported on a third pivot on said third gimbal for rotation about a fourth axis substantially ninety degrees to said third axis, said first, second and third pivots being provided with respective hydraulic drive means, and control means for selectively actuating each of said gimbals through actuation of said hydraulic drive means, said hydraulic drive means comprising vane type hydraulic means.

5. A multi-gimbal aircraft attitude simulator comprising a first gimbal supported for rotation about a first axis, a second gimbal supported on a first pivot on said first gimbal for rotation about a second axis substantially ninety degrees to said first axis, a third gimbal supported on a second pivot on said second gimbal for rotation about a third axis substantially ninety degrees to said second axis, a platform supported on a third pivot on said third gimbal for rotation about a fourth axis substantially ninety degrees to said third axis, said first, second and third pivots being provided with respective hydraulic drive means, and control means for selectively actuating each of said hydraulic drive means, said control means comprising electrically controlled valves for controlling said hydraulic drive means.

6. A multi-gimbal aircraft attitude simulator comprising a first gimbal supported for rotation about a first axis, a second gimbal supported on a first pivot on said first gimbal for rotation about a second axis substantially ninety degrees to said first axis, a third gimbal supported on a second pivot on said second gimbal for rotation about a third axis substantially ninety degrees to said second axis, a platform supported on a third pivot on said third gimbal for rotation about a fourth axis substantially ninety degrees to said third axis, said first, second and third pivots being provided with respective hydraulic drive means, and control means for selectively actuating each of said hydraulic drive means, said control means comprising electrically controlled valves for controlling said hydraulic drive means and feedback means for said control means for preventing overcontrol.

7. A multi-gimbal aircraft attitude simulator comprising a first gimbal supported for rotation about a first axis, a second gimbal supported on a first pivot on said first gimbal for rotation about a second axis substantially ninety degrees to said first axis, a third gimbal supported on a second pivot on said second gimbal for rotation about a third axis substantially ninety degrees to said second axis, a platform supported on a third pivot on said third gimbal for rotation about a third axis substantially ninety degrees to said second axis, said first, second and third pivots being provided with respective hydraulic drive means, and control means for selectively actuating each of said hydraulic drive means, said control means comprising electrically controlled valves for controlling said hydraulic drive means and feedback means for said control means for preventing overcontrol, said feedback means comprising potentiometers controlled by said hydraulic drive means to provide feedback voltage to said electrically controlled valves.

8. A multi-gimbal aircraft attitude simulator comprising a first gimbal supported for rotation about a horizontal axis, a second gimbal supported on a first pivot on said first gimbal for rotation about a second axis substantially ninety degrees to said horizontal axis, a third gimbal supported on a second pivot on said second gimbal for rotation about a third axis substantially ninety degrees to said second axis, a platform supported on a third pivot on said third gimbal for rotation about a fourth axis substantially ninety degrees to said third axis, said first, second and third pivots being provided with respective hydraulic drive means, and control means for selectively actuating each of said hydraulic drive means, said first gimbal when rotated ninety degrees providing yaw motion for said platform when the platform is in a vertical plane position.

9. A multi-gimbal aircraft attitude simulator comprising a plurality of interfitting pivotably associated gimbals, hydraulic vane motors, one vane motor associated with each gimbal, hydraulic valve means associated with each hydraulic vane motor, each said hydraulic valve being responsive to electrical energy to control its associated hydraulic vane motor, and feedback means for preventing hydraulic vane motor hunting, said feedback means comprising a potentiometer associated with each hydraulic vane motor for providing electrical feedback energy to control its associated hydraulic valve.

10. A flight simulator comprising a plurality of interfitting concentric gimbals with each gimbal having a pair of pivot supports pivotably securing each gimbal to its adjacent outer gimbal, fluid vane motors, one vane motor being associated with one of each pair of gimbal pivots for driving its associated gimbals, the other of each said pair of pivots being provided with concentric fluid passages for supplying fluid to said fluid vane motors.

11. A flight simulator comprising a plurality of interfitting concentric gimbals with each gimbal having a pair of pivot supports pivotably securing each gimbal to its adjacent outer gimbal, fluid vane motors, one vane motor being associated with one of each pair of gimbal pivots for driving its associated gimbals, the other of each said pair of pivots being provided with concentric fluid passages for supplying fluid to said fluid vane motors, said concentric fluid passages being provided with fluid seals allowing relative variation in pressure without interaction.

12. A flight simulator comprising a plurality of interfitting concentric gimbals with each gimbal having a pair of pivot supports pivotably securing each gimbal to its adjacent outer gimbal, fluid vane motors, one vane motor being associated with one of each pair of gimbal pivots for driving its associated gimbals, the other of each said pair of pivots being provided with concentric fluid passages for supplying fluid to said fluid vane motors, electrically controlled fluid control valves for controlling said fluid vane motors, electrical control conductors passing through each of said other of said pair of pivots to control said control valves.

13. A flight simulator comprising a plurality of interfitting concentric gimbals with each gimbal having a pair of pivot supports pivotably securing each gimbal to its adjacent outer gimbal, fluid vane motors, one vane motor being associated with one of each pair of gimbal pivots for driving its associated gimbals, the other of each said pair of pivots being provided with concentric fluid passages for supplying fluid to said fluid vane motors, electrically controlled fluid control valves for controlling said fluid vane motors, electrical control conductors passing through each of said other of said pair of pivots of control said control valves, said electrical control conductors forming a loop about said concentric fluid passages with sufficient diameter to allow substantially 360° rotation of each gimbal.

References Cited in the file of this patent

UNITED STATES PATENTS

| | | |
|---|---|---|
| 1,393,456 | Ruggles | Oct. 11, 1921 |
| 2,324,157 | Heintz | July 13, 1943 |
| 2,493,015 | Newton | Jan. 3, 1950 |
| 2,577,942 | Agins | Dec. 11, 1951 |
| 2,777,285 | McDonald | Jan. 15, 1957 |